(12) United States Patent
Barger

(10) Patent No.: US 7,292,501 B2
(45) Date of Patent: Nov. 6, 2007

(54) COMPACT SHOOTER LOCALIZATION SYSTEM AND METHOD

(75) Inventor: James E. Barger, Winchester, MA (US)

(73) Assignee: BBN Technologies Corp., Cambridge, MA (US)

( * ) Notice: Subject to any disclaimer, the term of this patent is extended or adjusted under 35 U.S.C. 154(b) by 92 days.

(21) Appl. No.: 10/925,414

(22) Filed: Aug. 24, 2004

(65) Prior Publication Data

US 2006/0044941 A1    Mar. 2, 2006

(51) Int. Cl.
*G01S 5/22* (2006.01)

(52) U.S. Cl. .............. 367/118; 367/124; 367/127; 367/906; 73/649

(58) Field of Classification Search .......... 367/178, 367/179, 906, 118, 124, 127, 129; 73/649; 181/122

See application file for complete search history.

(56) References Cited

U.S. PATENT DOCUMENTS

| | | | | |
|---|---|---|---|---|
| 2,435,231 | A | * 2/1948 | McPherson | ............... 367/178 |
| 4,970,698 | A | 11/1990 | Dumestre, III. | |
| 5,241,518 | A | 8/1993 | McNelis et al. | |
| 5,280,457 | A | 1/1994 | Figueroa et al. | |
| 5,346,210 | A | 9/1994 | Utke et al. | |
| 5,392,258 | A | * 2/1995 | Gabrielson et al. | ......... 367/178 |
| 5,777,948 | A | 7/1998 | Ferkinhoff et al. | |
| 5,781,505 | A | 7/1998 | Rowland | |
| 5,878,000 | A | * 3/1999 | Dubois | ............... 367/188 |
| 5,920,522 | A | 7/1999 | Levanon et al. | |
| 5,930,202 | A | 7/1999 | Duckworth et al. | |
| 5,973,998 | A | 10/1999 | Showen et al. | |
| 6,041,654 | A | 3/2000 | Stake | |
| 6,055,523 | A | 4/2000 | Hillis | |
| 6,178,141 | B1 | 1/2001 | Duckworth et al. | |
| 6,370,084 | B1 | * 4/2002 | Cray | ............... 181/122 |
| 6,563,763 | B2 | 5/2003 | McNelis | |
| 6,847,587 | B2 | 1/2005 | Patterson et al. | |
| 7,054,228 | B1 | * 5/2006 | Hickling | ............... 367/124 |

(Continued)

FOREIGN PATENT DOCUMENTS

GB    2 015 127 A    9/1979
WO    WO-02/082097 A2    10/2002

OTHER PUBLICATIONS

Pierce, Allan D., "Nonlinear Effects In Sound Propagation", *Acoustics, McGraw-Hill Book Company*, 1981, pp. 611-614.
Kalyanmoy DEB, Multi-Objective Optimization Using Evolutionary Algorithms, *John Wiley & Sons, Ltd.*, (2001), pp. 85-101.
US 5,168,475, 12/1992, McNelis et al. (withdrawn)

*Primary Examiner*—Ian J. Lobo
(74) *Attorney, Agent, or Firm*—Ropes & Gray LLP

(57) ABSTRACT

Systems and methods for locating the shooter of supersonic projectiles are described. Muzzle blast signals are neither sought nor required. The system uses at least two sensors, with each sensor having a 3-axis accelerometer. The sensors are spaced apart at least 1 meter and have each a diameter of about one centimeter. The three accelerometer signals of each sensor represent pressure gradients and are processed to find the shockwave arrival angle unit vector, the shockwave arrival time instant and peak pressure. Noise signals seldom cause false detections with this sensing method because the sensors have maximum sensitivity at the high frequency characteristics of shockwaves, while their sensitivity to the low frequency characteristics of ambient noise is relatively low.

24 Claims, 4 Drawing Sheets

U.S. PATENT DOCUMENTS 7,139,222 B1 11/2006 Baxter et al.
2004/0100868 A1 5/2004 Patterson, Jr. et al.
2005/0194201 A1* 9/2005 Tenghamn et al. .......... 181/112
2006/0256660 A1 11/2006 Berger

* cited by examiner

COMPACT SHOOTER LOCALIZATION SYSTEM AND METHOD

BACKGROUND OF THE INVENTION

The present invention relates to law enforcement technologies and security, and more particularly to methods and systems for determining the origin and direction of travel of supersonic projectiles based on shockwave-only information.

Systems and methods are known that can determine the general direction and trajectory of supersonic projectiles, such as bullets and artillery shells by measuring parameters associated with the shockwave generated by a projectile. One such system, described in U.S. Pat. No. 5,241,518 includes at least three spaced-apart sensors, with each sensor incorporating three acoustic transducers arranged in a plane. The sensors generate signals in response to the shockwave which are related to the azimuth and elevation angle to the origin of the shockwave. Shock-wave-only measurements are unable to determine the distance between the sensor(s) and the origin of the shockwave. Distance information is typically obtained from the muzzle flash or muzzle blast.

The azimuth and elevation angle of a shooter with reference to the sensor location are typically determined by measuring Time-of-Arrival (TOA) information of the shockwave at each sensor. Each of the sensors encounters the shockwave at a different time and generates a signal in response to the shockwave pressure. The signals from the various sensors are processed, and a direction (azimuth and elevation) from the sensor(s) to the origin of the shockwave and hence the trajectory of the projectile can be determined.

Conventional systems employ microphones, which can be relatively closely spaced (e.g., 1 meter apart) or widely dispersed (e.g., mounted on a vehicle or carried by soldiers on a battlefield), and measure shockwave pressure omni-directionally at their respective locations. One exemplary antenna includes a total of 7 omni-directional microphones, with 6 microphones distributed over the surface of a sphere (approx. diameter 1 m) and the seventh microphone located in the center of the sphere. An arrangement with less than 7 microphones can produce lobes in the spatial sensitivity pattern of the microphone array.

The relatively large antenna size and the large number of sensors can be a major disadvantage, for example, in vehicle-mounted systems. In addition, prior systems sense sound pressure and hence require special high-pass and low-pass filters for correctly differentiating between shockwave signals and ambient noise signals. Ambient noise signals can be as large or even larger than shockwave sound pressures. In addition, systems that omni-directionally measure sound pressure can generate ambiguous solutions in which the Time-of-Arrival of the shockwave at a given set of sensors is nearly identical for two mirror-symmetric shooter locations.

It would therefore be desirable to provide a system and method that is able to determine the trajectory of a supersonic projectile with a smaller number of sensors that occupy less space, and is also capable of differentiating between shockwave signals and ambient noise and eliminating the ambiguity in the determination of the shooter position.

SUMMARY OF THE INVENTION

The disclosed methods and systems are directed, inter alia, to force sensors for determining the origin and direction of travel of supersonic projectiles based on shockwave-only information.

According to one aspect of the invention, a sensor for determining a pressure gradient generated by a shockwave includes a support structure, a substantially spherical body elastically supported by the support structure for movement in at least two directions, and an accelerometer enclosed in the body and generating an output signal in response to a force applied to the body. The force is produced by the pressure gradient and the output signal indicates a magnitude and direction of the pressure gradient.

According to another aspect of the invention, a system for determining the trajectory of a supersonic projectile includes at least two spaced-apart sensors, wherein the sensors are supported by a support structure at a known location and encounter a shockwave generated by the supersonic projectile. Each sensor includes a substantially spherical body elastically supported by the support structure for movement in at least two directions, and an accelerometer enclosed in the body and generating an output signal in response to a force applied to the body. The force is produced by a pressure gradient of the shockwave and the output signal indicates a magnitude and direction of the pressure gradient and an arrival time of the shockwave at the sensor. The system further includes a processor that processes the output signal and the arrival time from at least two sensors to provide parameter information for determining the trajectory of the supersonic projectile.

According to yet another aspect of the invention, a method for estimating the trajectory of a supersonic projectile, with the projectile producing a shockwave, includes the steps of providing at least two spaced apart sensors having a known location and orientation, whereby each sensor is adapted to measure a three-dimensional pressure gradient at the sensor location. The sensors generate a shockwave information signal in response to the measured pressure gradients. The method further includes the steps of processing the shockwave information signal and determining from the shockwave information signal trajectory parameter information of the projectile.

Embodiments of the invention may include one or more of the following features. The accelerometer can be a three-axes accelerometer that produces output signals representative of an acceleration in three mutually independent, for example orthogonal, directions. The substantially spherical body can made of a lightweight metal, such as aluminum, or a plastic material, such as a plastic (polyurethane) foam. The foam can be protected by a protective, e.g., waterproof layer for operation in harsh environments.

The support structure can be a frame of suitable shape, for example circular or rectangular, with the body being supported in the frame by a wire, a thread or a tape. Advantageously, the support of the body can include damping means. Alternatively, the body can be supported on an elastic member that permits excursions in three independent directions, such as a spring.

Advantageously, the frame and/or the support structure has a relatively low characteristic oscillation frequency, for example less than 1 kHz, preferably less than 100 Hz, so as not to interfere with the shockwave detection.

The shockwave information signal can include magnitude and direction of the pressure gradient measured at two or more sensors and the time of arrival of the shockwave at the sensors. The parameter information for determining the trajectory of the supersonic projectile can include shooter direction azimuth, shooter direction elevation, trajectory direction azimuth, trajectory direction elevation, muzzle velocity, and bullet drag coefficient.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF CERTAIN ILLUSTRATED EMBODIMENTS

The invention is directed, inter alia, to a system and method for determining the direction, as defined by azimuth and elevation, of a shooter location and a trajectory of supersonic projectiles. The system includes two or more sensors, with each sensor having three accelerometers, the signals of which are processed to find the shockwave arrival angle unit vector, the shockwave arrival time instant and peak pressure. The sensor's sensitivity is greatest at the high frequency characteristics of shockwaves and much less at the lower frequency characteristics of ambient noise.

Figure 1:
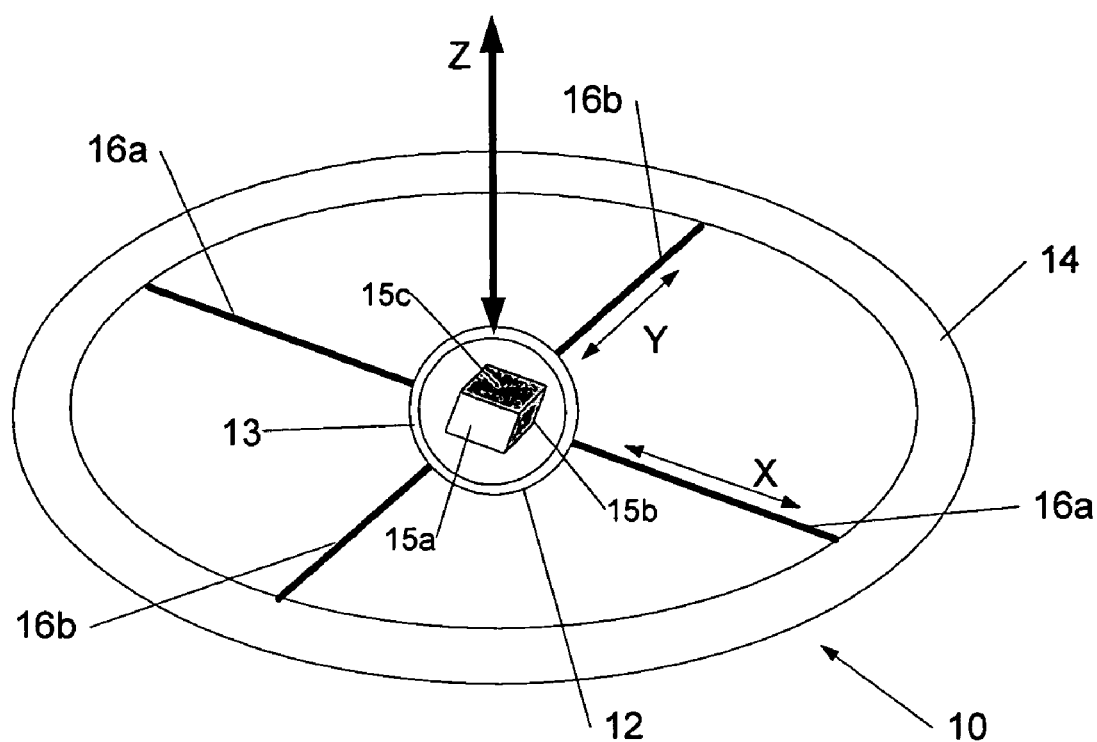
FIG. 1 shows schematically a first embodiment of a sensor capable of measuring pressure gradients in three orthogonal directions.

Referring now to FIG. 1, in one exemplary embodiment, a sensor unit 10 includes a frame or holder 14 and a sensor 12 suspended in the holder so as to allow movement of the sensor 12 in three substantially orthogonal directions X, Y and Z (indicated by arrows). The sensor 12 includes a housing 13 made of, for example, aluminum, with a 3-axis accelerometer that incorporates three independent accelerometer elements 15a, 15b, 15c providing independent signals representative of the acceleration of the sensor 12 in the respective X, Y, and Z directions. The sensor 12 is suspended in a holder 14 by, for example, threads, wires or strings 16a, 16b. The electrical signal produced by the accelerometer elements 15a, 15b, 15c can be transmitted to an input terminal of a suitable signal processor via electrical wiring (not shown) that can be routed, for example, along the suspension wires 16a, 16b.

The sensor 12 does not experience a net force when the uniform pressure is applied, even if the magnitude of the pressure changes. In this situation, the output signal of the accelerometers is zero, except for a possible constant bias. However, if the sensor 12 is exposed to a pressure gradient, i.e. when the pressure on one side of the sphere 12 is different from the pressure on another side of the sphere 12, then a net force is applied to the sensor 12 in the direction of the pressure gradient, creating an acceleration that is proportional to the force and inversely proportional to the sensor mass. The output signals of the accelerometer elements 15a, 15b, 15c is representative of the acceleration experienced by the sensor 12 in the respective X, Y, Z directions.

Various types of accelerometers are known in the art, such as accelerometers micromachined from silicon, piezoelectric materials, and the like. A suitable accelerometer is, for example, the Endevco Model 25A ISOTRON accelerometer, available from Endevco Corporation, San Juan Capistrano, Calif. Accelerometers should be selected to have a low cross-axis coupling or crosstalk, for example, less than 1%, for reliably decoupling the signals generated in three independent directions.

Figure 2:
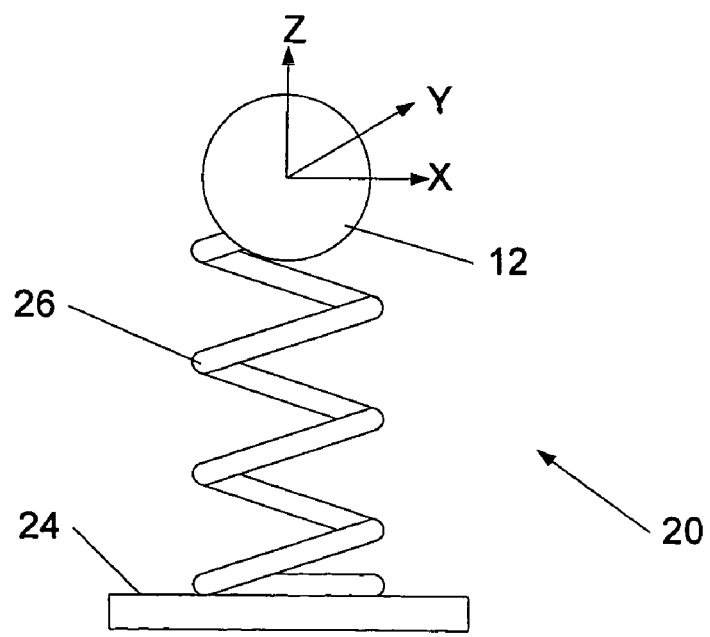
FIG. 2 shows schematically a second embodiment of a sensor capable of measuring pressure gradients in three orthogonal directions.

As shown in FIG. 2, the sensor 12 of FIG. 1 can also be mounted, for example, on one end of a resilient element, such as spring 26. The other end of spring 26 can be attached to, for example, a stationary support 24. As before, the sphere 12 can move in three orthogonal directions X, Y and Z, with the accelerometers embedded in the sphere producing acceleration signals proportional to the force exerted on the sphere by the pressure gradient. Care should be taken to position the center of gravity of the accelerometer at the center of the sphere, since the applied force, which acts through the center of the sphere, could otherwise cause the sensor to twist, thereby inducing acceleration not entirely representative of the force.

Figure 3:
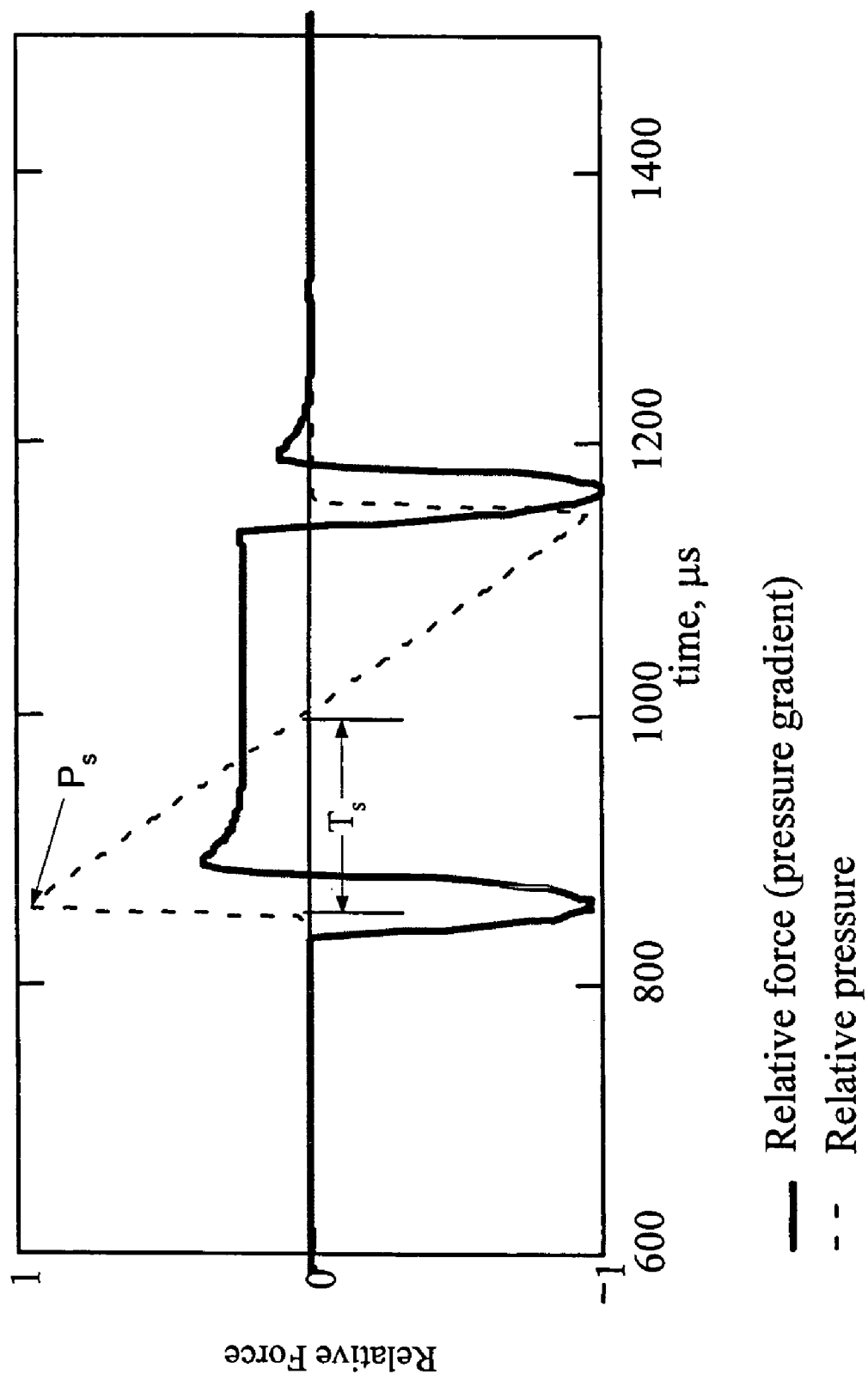
FIG. 3 shows the force applied to the sensors of FIG. 1 and FIG. 2 by the pressure gradient of a shockwave emanating from a projectile.

FIG. 3 shows a response of the sensor 10, 20 to an exemplary shockwave propagating past the sensor, creating a force that is proportional to the pressure gradient in the propagation direction of the shockwave. This force creates acceleration inversely proportional to the sensor mass. The exemplary curves of FIG. 3 are for a shockwave pulse propagating past a 12 mm diameter aluminum sphere suspended in the holder 14 of FIG. 1. The pulse parameters are typical of a shockwave from a bullet passing at 30 m from the sensor, exhibiting a peak pressure of approximately 100 Pa and half-span $T_s$ of approximately 150 µs. The 3-axis accelerometer used in the experiment is fabricated from three Endevco Model 25A ISOTRON accelerometer elements and mounted inside an aluminum sphere having a diameter of 12 mm and a wall thickness of 0.7 mm for a total mass of 1.1 g. It will be understood that other lightweight metals or metal alloys as well as plastic materials, such as a plastic foam protected by a waterproof surface layer, can be used instead of or in addition to aluminum. Each accelerometer element has a mass of 0.2 g, a diameter of 5 mm, a resonance frequency of 50 kHz, and a sensitivity of 5 mV/G. The maximum experienced force corresponds to an acceleration of 1 G, so that the maximum output voltage is 5 mV. As mentioned above, at least in the linear excursion region of sphere 12, the peak outputs of each of the three accelerometers are proportional to the unit vectors of the propagation direction along their respective orientations.

Figure 4:
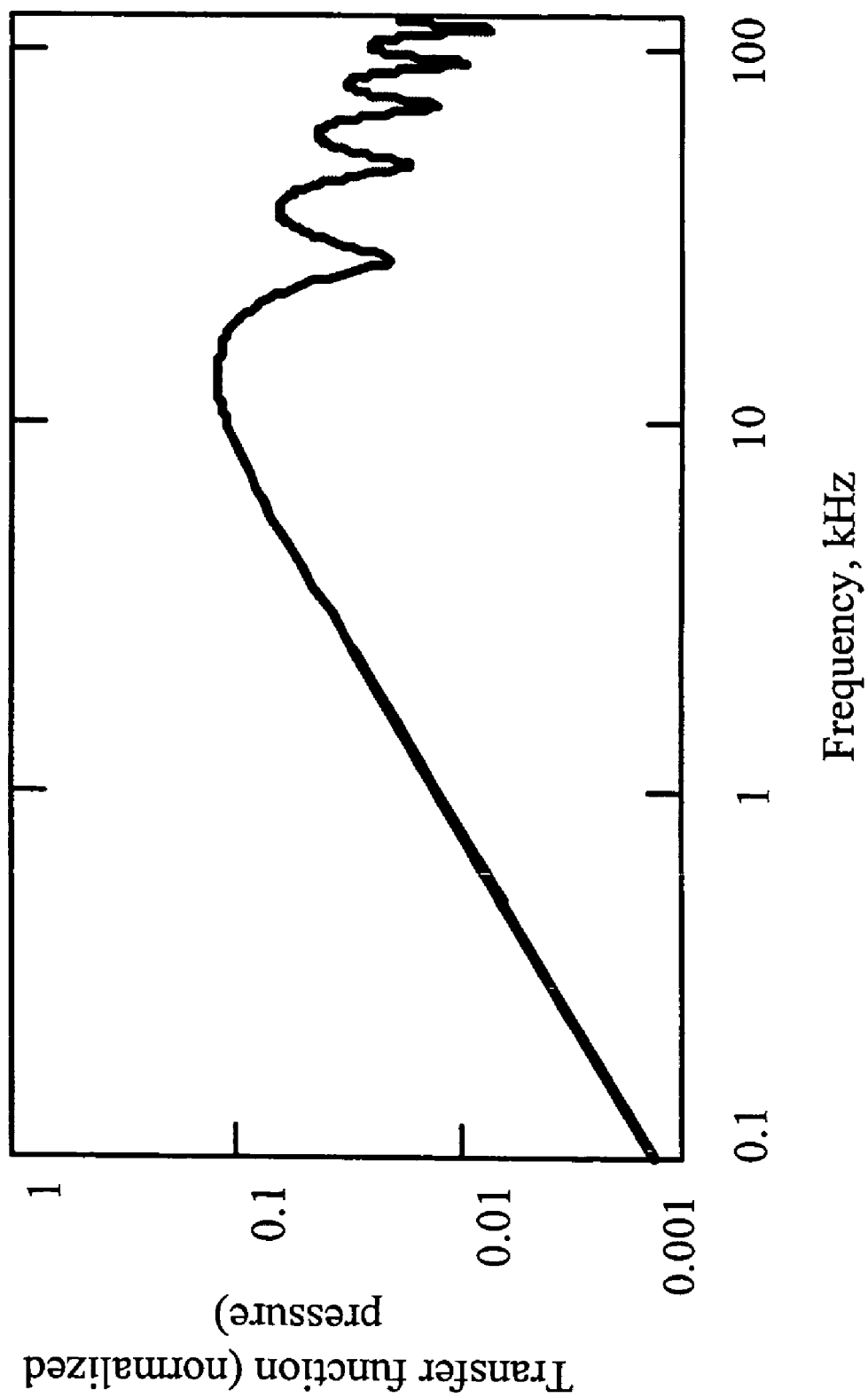
FIG. 4 shows the force transfer function of the sensors of FIG. 1 and FIG. 2 as a function of frequency.

A principal advantage of the pressure gradient sensor is its relatively low sensitivity to low-frequency forces and/or pressure gradients. FIG. 4 shows a frequency plot of the force induced on the 12 mm diameter sphere per unit sound pressure. The measured sensitivity peaks at a frequency of about 12 kHz, and falls off at a rate of 6 dB/octave at lower frequencies. In this way, the pressure gradient sensor is naturally matched to the frequency content of shockwaves, which have most of their signal energy at frequencies above about 6 kHz. This reduces the complexity of the detection circuit, since low-pass filters can be eliminated. For comparison, ambient noise from, for example, wind and vehicle motion, has the greatest signal energy at frequencies below 6 kHz and is therefore naturally attenuated.

Figure 5:
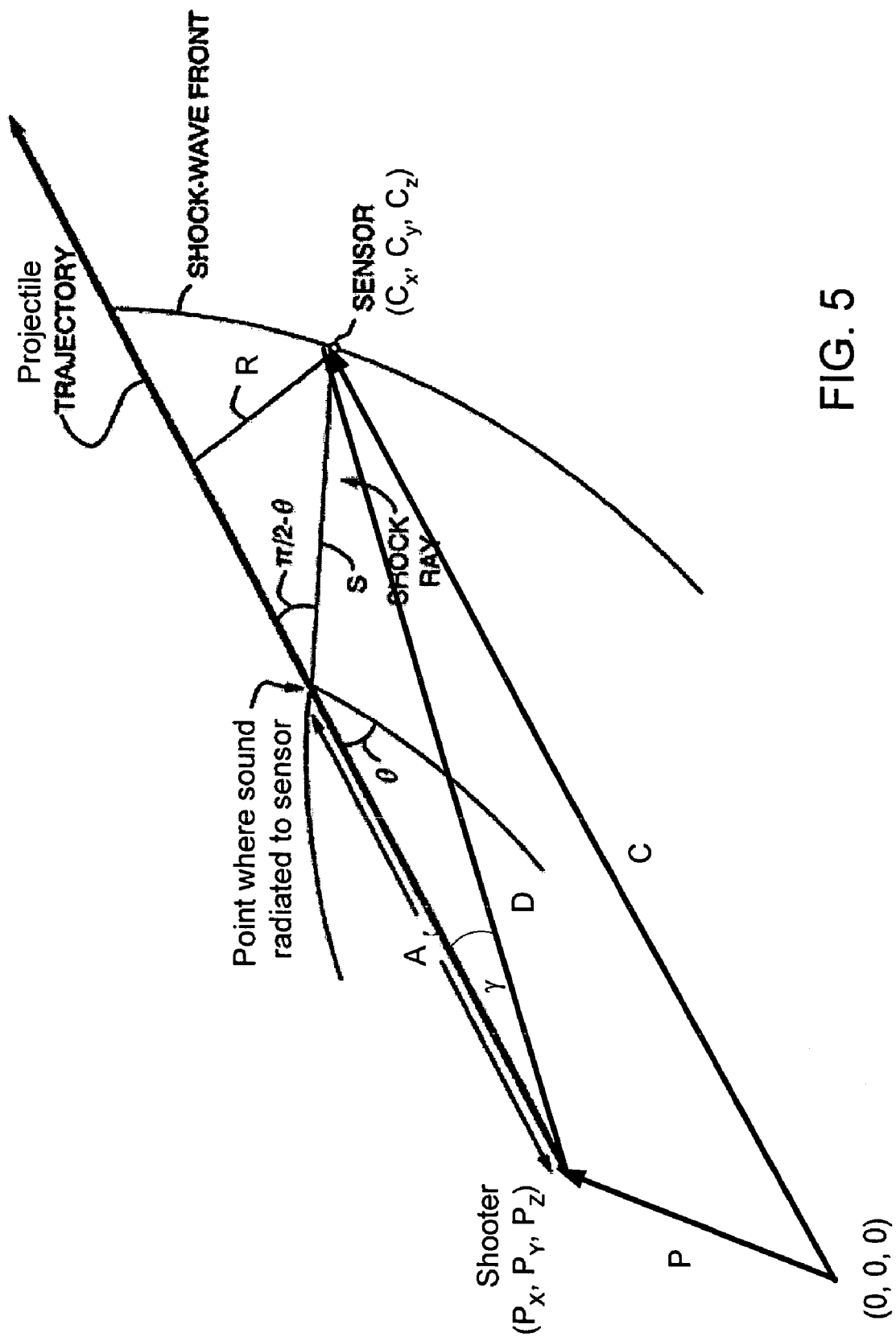
FIG. 5 is a schematic diagram of a shockwave Time-of-Arrival (TOA) model.

Referring now to FIG. 5, a Time of Arrival (TOA) model, which is described in more detail in U.S. Pat. No. 6,178,141 (incorporated herein by reference in its entirety), is used to estimate the trajectory of the projectile and the shooter direction relative to the sensor location. The TOA model is based on an accurate ballistic model taking into account certain physical characteristics relating to the projectile, including: the air density (which is related to temperature); the Cartesian position of a shooter; the azimuth and elevation angles of the rifle muzzle; the muzzle velocity of the projectile (Mach number); and the speed of sound (which varies with temperature/air density). With this ballistic model, it is possible to accurately calculate, at any particular point in space, the exact time at which the shockwave (and muzzle blast, if used) reach a particular point in space.

Measurements of a shockwave's three unit vectors and arrival time at two or more of the aforedescribed pressure gradient sensors are sufficient to determine uniquely the shooter location, bullet trajectory, and caliber. Relative to an origin (0, 0), the shooter is located at point P ($P_X$, $P_Y$, $P_Z$), the sensor at point C ($C_X$, $C_Y$, $C_Z$), and the bullet trajectory is shown emanating from the shooter in the direction of $|\vec{A}|$. The vector distance between the shooter and $j^{th}$ sensor is $|\vec{D}_j|$, the closest point of approach (CPA) of the bullet to the sensor is $|\vec{R}_j|$, and the path followed from the point where the shockwave is radiated from the trajectory to the $j^{th}$ sensor is $\vec{S}$. The Mach angle of the bullet is $\theta = \sin^{-1}(1/M)$, $M = V/c_0$. M is the Mach number of the projectile, V is the supersonic velocity of the projectile, and $c_0$ is the (pressure- and temperature-dependent) speed of sound. The 'miss-angle' between trajectory and the $j^{th}$ sensor is $\gamma_j$. The trajectory is characterized by its azimuth angle $\alpha$ measured counter clockwise from the x-axis in the x-y plane and by its elevation angle $\phi$ measured upward from the x-y plane. The equations that define the shockwave arrival time $t_j$ and unit vector at the $j^{th}$ sensor are written in terms of these geometrical quantities.

The time of arrival is equal to the time $$\frac{|\vec{A}_j|}{V}$$

it takes for the projectile to travel the distance $|\vec{A}_j|$ to the point were sound is radiated toward the $j^{th}$ sensor, plus the time it takes the shockwave to travel the distance $|\vec{S}_j|$ from that radiation point to the $j^{th}$ sensor, $$\frac{|\vec{S}_j|}{c_0}.$$

$$t_j = t_0 + \frac{|\vec{A}_j|}{V} + \frac{|\vec{S}_j|}{c_0} = t_0 + \frac{|\vec{D}_j|}{c_0}\sin(\gamma_j + \theta), \quad (1)$$

wherein $t_0$ is a time reference (firing time). The closest point of approach (CPA) between the projectile trajectory and the $j^{th}$ sensor is $$|\vec{R}_j| = |\vec{D}_j|\sin(\gamma_j). \quad (2)$$

The CPA (or $|\vec{R}_j|$) can be independently determined from the measured slope of the shockwave depicted in FIG. 2 from the following equation:

$$|\vec{R}_j| = \frac{\rho c^3 \sqrt{M_j^2 - 1}}{2\beta M_j (P_s/T_s)_j} \quad (3)$$

$M_j$ is the projectile's Mach number at the point where sound is radiated to the $j^{th}$ sensor along the projectile's trajectory $|\vec{A}|$, and $\rho$, c, $\beta$ are the atmospheric density, sound velocity, and non-linear parameter $\beta \cong 1.3$. The slope of the shockwave is its peak pressure $P_s$ divided by the half-span $T_s$ (see FIG. 3).

The velocity V of the projectile can be assumed to be constant along its trajectory, if the sensors are closely spaced, so that there is insignificant loss of speed between the times the projectile radiates to the different sensors. In a more general case, however, a mathematical ballistics model that predicts the arrival time of a shockwave at any general point in space as a function of the full set of parameters can be used. It is derived from physical principles, and has an accuracy of approximately 10 parts per million (ppm). The mathematical model is described in detail in U.S. Pat. No. 6,178,141, the content of which is incorporated herein by reference in its entirety. For comparison, conventional empirically derived ballistic models have nominal 1 m accuracy at 1 km, or 1000 ppm.

The ballistic model includes the bullet drag coefficient $C_b$, which depends upon the projectile's caliber. The caliber may be estimated from either the peak pressure $P_s$ or the half-span $T_s$, using the following equation that depends upon projectile's parameters S (cross sectional area), L (length), and K (a constant dependent upon bullet shape).

$$(T_s)_j = \frac{2^{0.75}\beta^{0.5}M_j S^{0.5} K \cdot |R_j|^{0.25}}{L^{0.25}c_0(M_j^2 - 1)^{3/8}}. \quad (4)$$

Once the caliber is found, its unique drag coefficient $C_b$ is known. This parameter is important in the ballistic model prediction of projectile's trajectory. In the context of the present discussion, the drag coefficient is assumed to be proportional to the square root of Mach number M. A more accurate model is described in U.S. Pat. No. 5,930,202, the content of which is incorporated herein by reference in its entirety. The distance $|\vec{A}_j|$ and the time $t_j^{A_j}$ to reach the point where sound is radiated to the $j^{th}$ sensor are defined in terms of the initial muzzle velocity $V_0$, the local velocity $V = Mc_0$, and drag coefficient $C_b$.

$$|\vec{A}_j| = C_b(\sqrt{V_0} - \sqrt{c_0/\sin(\theta_j)})$$

$$t_j^{A_j} = \frac{|\vec{A}_j|}{V_0 - \sqrt{V_0}A/C_b} \quad (5)$$

The following nonlinear equations must be solved when the ballistic model predictions are included:

$$t_1 \equiv t_0 + t_1^{A_1} + \frac{|S_1|}{c_0}$$

$$t_2 \equiv t_0 + t_2^{A_2} + \frac{|S_2|}{c_0}$$

$$|R_1| \equiv |D_1| \sin(\gamma_1)$$

$$|R_2| \equiv |D_2| \sin(\gamma_2)$$

$$\frac{vx_1}{\sqrt{vx_1^2 + vy_1^2 + vz_1^2}} \equiv \frac{Cx_1 - Px - Ax_1}{\sqrt{Cx_1^2 + Px^2 + Ax_1^2}} \quad (6)$$

$$\frac{vy_1}{\sqrt{vx_1^2 + vy_1^2 + vz_1^2}} \equiv \frac{Cy_1 - Py - Ay_1}{\sqrt{Cy_1^2 + Py^2 + Ay_1^2}}$$

$$\frac{vz_1}{\sqrt{vx_1^2 + vy_1^2 + vz_1^2}} \equiv \frac{Cz_1 - Pz - Az_1}{\sqrt{Cz_1^2 + Pz^2 + Az_1^2}}$$

$$\frac{vx_2}{\sqrt{vx_2^2 + vy_2^2 + vz_2^2}} \equiv \frac{Cx_2 - Px - Ax_2}{\sqrt{Cx_2^2 + Px^2 + Ax_2^2}}$$

$$\frac{vy_2}{\sqrt{vx_2^2 + vy_2^2 + vz_2^2}} \equiv \frac{Cy_2 - Py - Ay_2}{\sqrt{Cy_2^2 + Py^2 + Ay_2^2}}$$

$$\frac{vz_2}{\sqrt{vx_2^2 + vy_2^2 + vz_2^2}} \equiv \frac{Cz_1 - Pz - Az_2}{\sqrt{Cz_2^2 + Pz^2 + Az_2^2}}$$

The three-bar equals signs indicate where the right hand side is forced to equal the measurement data on the left. The following identities were used to simplify the equations; these equations do not contain data:

$$|D_1|\cos(\gamma_1+\theta_1) \equiv A_1 \cos(\theta_1)$$

$$|D_2|\cos(\gamma_2+\theta_2) \equiv A_2 \cos(\theta_2) \quad (7)$$

Accordingly, there are 10 independent nonlinear equations, of which only 8 are required (redundancy). Normalized accelerometer signal voltages in the x, y, z directions for the $j^{th}$ sensor are denoted $vx_j$, $vy_j$, $vz_j$, i.e., the subscripts 1 and 2 denote the two different accelerometers or pressure gradient sensors. Therefore, the nonlinear equations can be solved for the unknown parameters. In addition, two of the unknowns (drag coefficient and muzzle velocity) are uniquely related to the projectile's caliber, which can be estimated from the independent equation involving CPA (or $|\vec{D}_j|$) and shockwave pressure slope. This fact allows for the inclusion of constraints on CPA while solving the equations, thereby improving the accuracy of parameter estimation. If additional sensors are used, then redundant data collected this way can be used in the solver further to improve parameter estimation accuracy.

One possible estimation algorithm for trajectory estimation is a variant of the Levenberg-Marquardt method of non-linear least squares. The variation is in the weighing of the residuals. The weighing method used gives an L1 type solution: i.e., minimum absolute value. The weights at each iteration are recalculated using the size of the residuals to effectively "throw out" outliers. The L1 Levenberg-Marquardt algorithm is detailed in U.S. Pat. No. 5,930,202 and operates as follows:

1. Compute the residuals, weights, and the initial cost, $E_0$;
2. For the $k^{th}$ iteration, calculate the elements of a weighted derivative matrix, H;
3. Calculate the next estimate of x by solving for δx and adding it to the current value of x;
4. Calculate the new weights, weighted residuals, and cost, $E_k$, at the new state, $x_k$;
5. If the cost is greater than the previous cost, discard this estimate of x(k), increase λ by a substantial factor, for example by a factor 10, and repeat from step 3; or
6. If the cost is less than the previous cost and the solution has not converged, decrease λ by the same factor and repeat from step 2.

There are three ways of exiting the iteration loop: reaching convergence, reaching the maximum number of allowed iterations (e.g., set at 50), or having λ increase to a predetermined limit. Convergence is defined by the ratio of the new cost, to the previous cost x(k)/x(k−1). If the ratio is between 0.9995 and 1, either at a local minimum has been reached or the cost function surface has a flat valley, so that further iterations will not improve the result. A status flag is typically returned indicating which condition occurred.

Is has been found that a global minimum of the shooter direction and the projectile trajectory can be computed more quickly and reliably by using an evolutionary genetic algorithm (GA). GAs mimic natural evolutionary principles and apply these to search and optimization procedures. Most classical point-by-point algorithms use a deterministic procedure for approaching the optimum solution, starting from a random guess solution and specifying a search direction based on a pre-specified transition rule, such as direct methods using an objective function and constraint values and gradient-based methods using first and second order derivatives. However, these methods have disadvantages, for example, that an optimal solution depends on the selected initial solution and that most algorithms get "stuck" at a sub-optimal solution.

Unlike classical search and optimization methods, a GA begins its search with a random set of solutions, instead of just one solution. Once a random population of solutions is created, each is evaluated in the context of the nonlinear programming problem and a fitness (relative merit) is assigned to each solution. In one embodiment, the fitness can be represented by the Euclidean distance between a calculated solution and the measured solution. For example, one solution can be defined by the shockwave-induced voltages and Time-Difference-of-Arrival (TDOA) at the two or more sensors j. In other words, the goal is to find $$\Delta V_{min} = \min \sqrt{\sum_j \{(vx_j^{calc} - vx_j^{meas})^2 + (vy_j^{calc} - vy_j^{meas})^2 + (vz_j^{calc} - vz_j^{meas})^2\}}$$

and $$\Delta \tau_{min} = \min \sqrt{\sum_j (\tau_{calc} - \tau_{meas})^2} \quad (8b)$$

wherein the sum is taken over all sensors. Alternatively or in addition, the minimum residual of the CPA ($|\vec{D}|$) distance can also be used as a criterion:

$$\Delta |\vec{D}|_{min} = \min \sqrt{\sum_j (|\vec{D}_j|_{calc} - |\vec{D}_j|_{meas})^2} \quad (8c)$$

Intuitively, an algorithm having a small value of $\Delta V_{min}$, $\Delta \tau_{min}$ and/or $\Delta |D|_{min}$ is better.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A sensor for determining a pressure gradient generated by a shockwave, comprising:
    a support structure;
    a substantially spherical body made of aluminum and elastically supported by the support structure for movement in at least two directions;
    an accelerometer enclosed in the body and generating an output signal in response to a force applied to the body;
    wherein the force is produced by the pressure gradient and the output signal indicates a magnitude and direction of the pressure gradient.

2. The sensor of claim 1, wherein the sensor has a sensitivity peak in a frequency range that matches a maximum signal energy range of the shockwave.

3. The sensor of claim 1, wherein the sensor has a sensitivity peak in a frequency range above about 6 kHz.

4. The sensor of claim 1, wherein the sensor has a sensitivity peak at a frequency of about 12 kHz.

5. The sensor of claim 1, wherein the sensor has a sensitivity peak in a frequency range having frequencies greater than a frequency of signal energy produced by ambient noise.

6. A system for determining the trajectory of a supersonic projectile comprising:
    at least two spaced-apart sensors, the sensors supported by a support structure at known coordinate positions and encountering a shockwave generated by said supersonic projectile, each sensor comprising;
    a substantially spherical body elastically supported by the support structure for movement in at least two directions;
    an accelerometer enclosed in the body and generating an output signal in response to a force applied to the body, wherein the force is produced by a pressure gradient of said shockwave and the output signal indicates a magnitude and direction of the pressure gradient and an arrival time of the shockwave at the sensor; and
    a processor processing the output signals and the arrival times from the at least two sensors and unambiguously determining said trajectory of said supersonic projectile.

7. The system of claim 6, wherein the accelerometer is a three-axes accelerometer producing output signals representative of an acceleration in three mutually independent directions.

8. The system of claim 6, wherein the substantially spherical body is made of a lightweight metal or a plastic material.

9. The system of claim 8, wherein the plastic material comprises a plastic foam with a waterproof surface.

10. The system of claim 8, wherein the lightweight metal comprises aluminum.

11. The system of claim 6, wherein the support structure comprises a frame.

12. The system of claim 11, wherein the frame is constructed to have a characteristic oscillation frequency of less than 1 kHz.

13. The system of claim 11, wherein the body is supported in the frame by wire, thread or tape.

14. The system of claim 13, wherein the body is supported by the support structure, with the support structure having a characteristic oscillation frequency of less than 1 kHz.

15. The system of claim 13, wherein the body is supported by the support structure, with the support structure having a characteristic oscillation frequency of less than 100 Hz.

16. The system of claim 13, wherein the support structure comprises an elastic member.

17. The system of claim 16, wherein the elastic member comprises a spring.

18. The system of claim 6, wherein information for determining said trajectory is selected from the group consisting of shooter direction azimuth, shooter direction elevation, trajectory direction azimuth, trajectory direction elevation, muzzle velocity, and bullet drag coefficient.

19. The system of claim 6, wherein the at least one sensor has a sensitivity peak in a frequency range that matches a maximum signal energy range of the shockwave.

20. The system of claim 6, wherein the at least one sensor has a sensitivity peak in a frequency range above about 6 kHz.

21. The system of claim 6, wherein the at least one sensor has a sensitivity peak at a frequency of about 12 kHz.

22. The system of claim 6, wherein the at least one sensor has a sensitivity peak in a frequency range having frequencies greater than a frequency of signal energy produced by ambient noise.

23. The system of claim 6, wherein the processor is configured to determine the trajectory of the supersonic projectile for detecting a shooter location.

24. The system of claim 6, wherein the processor is further configured to detect the location of a shooter of the supersonic projectile.

* * * * *